Figure 9:
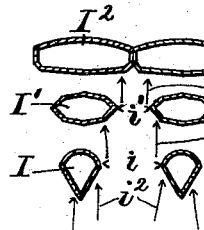

(No Model.) 4 Sheets—Sheet 1.
L. R. BLACKMORE.
STEAM OR HOT WATER HEATING BOILER.
No. 531,298. Patented Dec. 25, 1894.
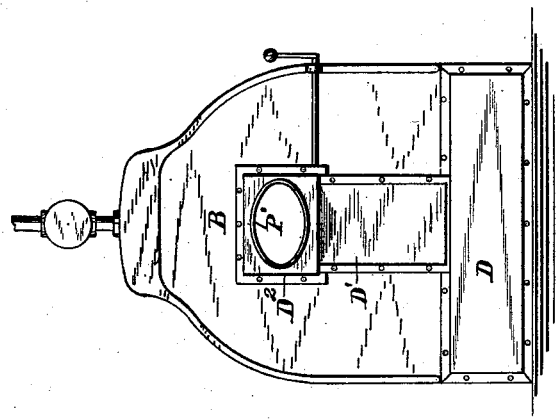
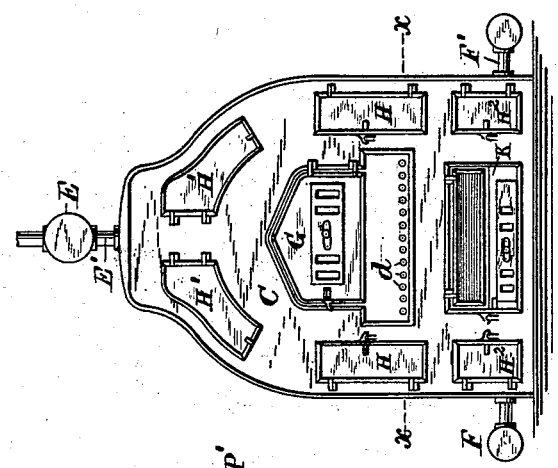
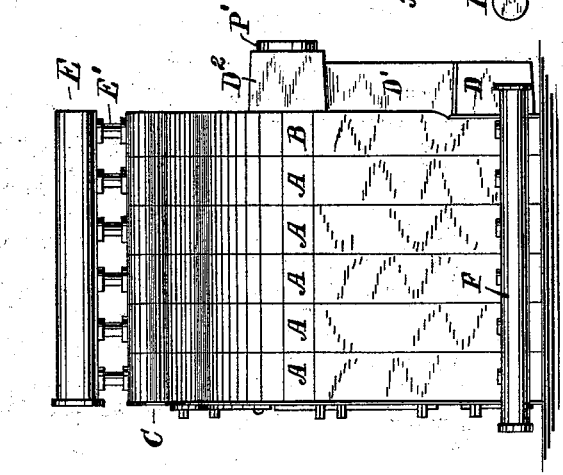
Attest:
L. Lee
Edw. Kinsey
Inventor.
Lawrence R. Blackmore
per Thomas S. Crane, Atty.

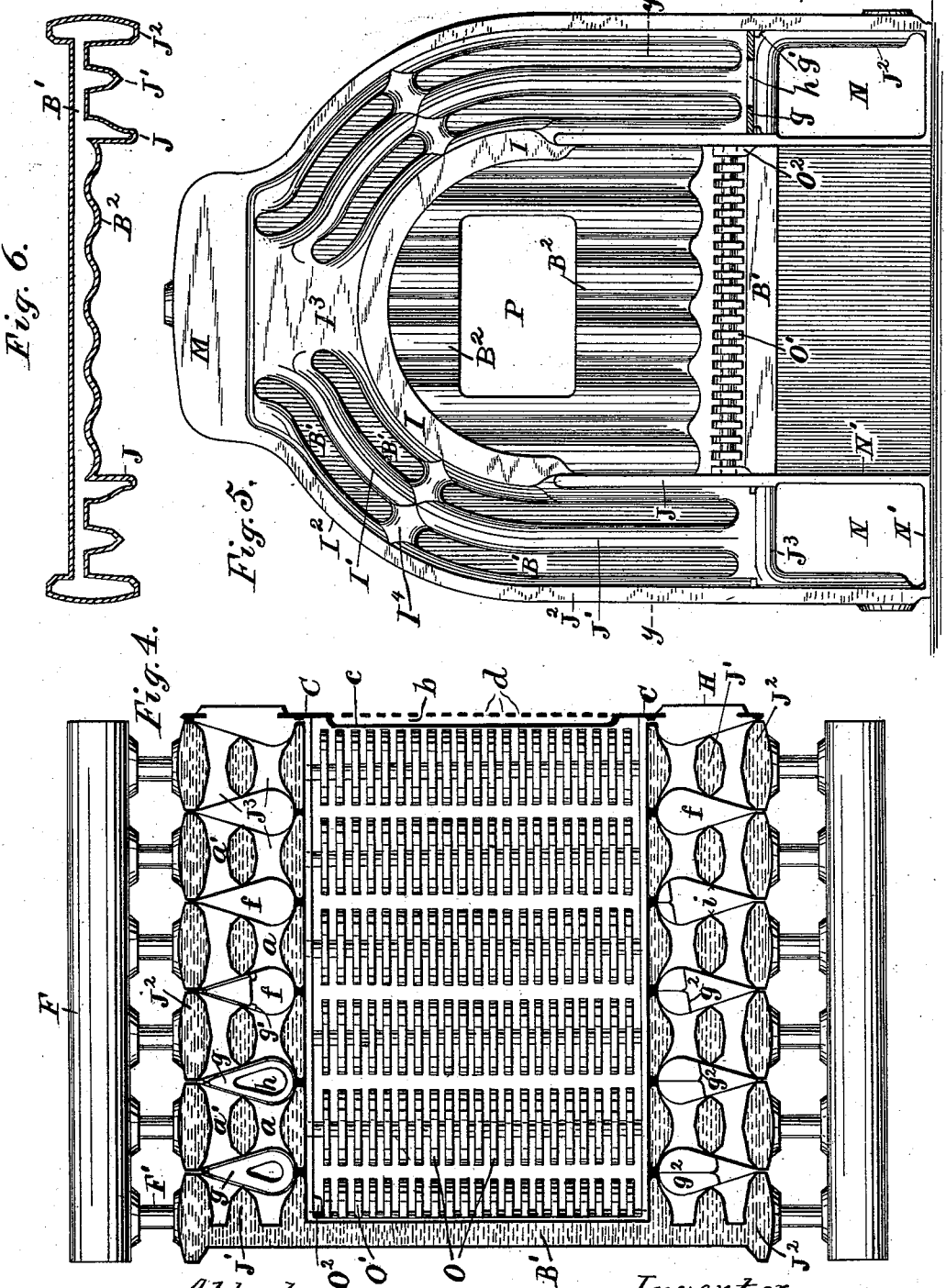

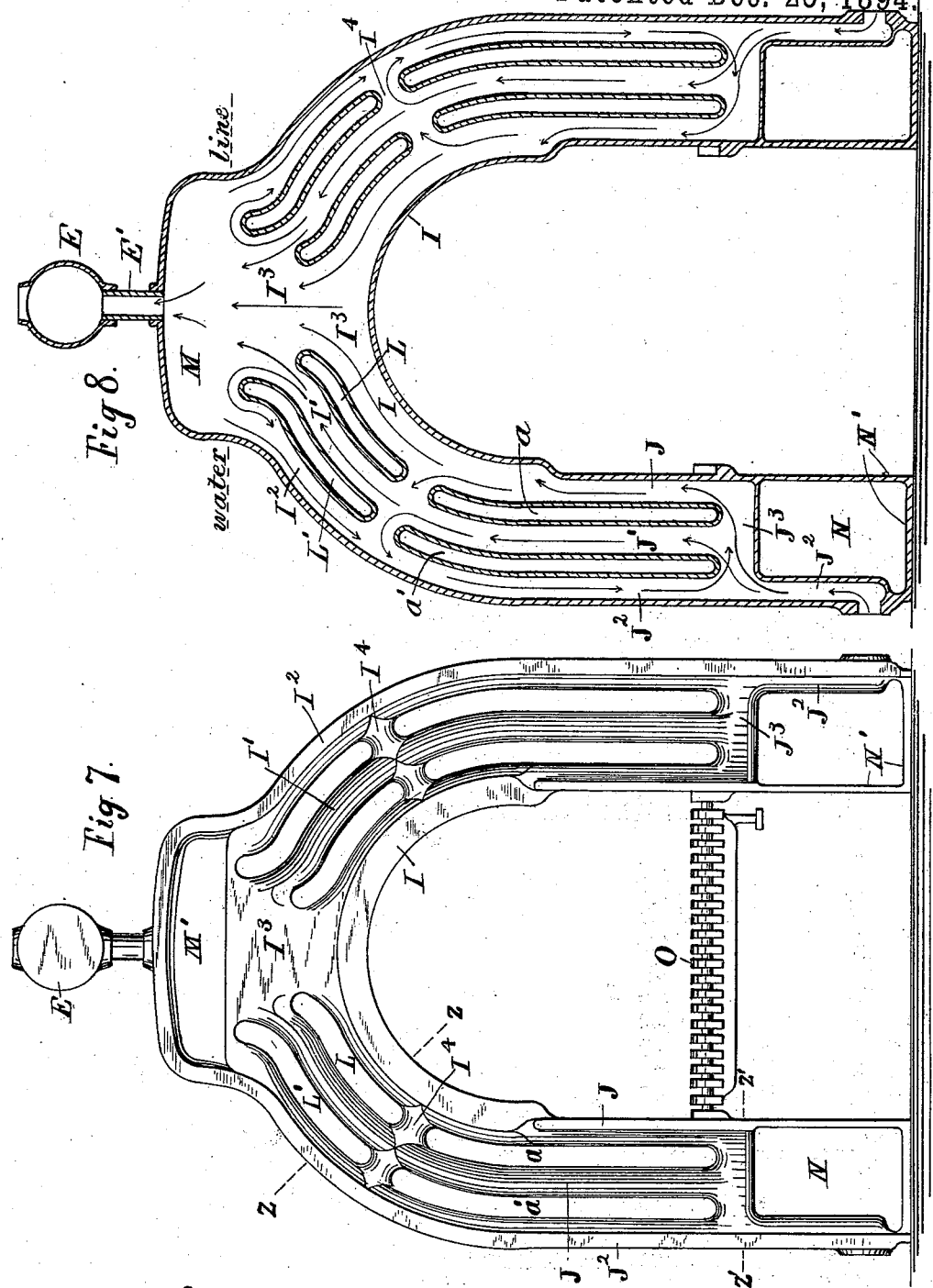

(No Model.) 4 Sheets—Sheet 4.

L. R. BLACKMORE.
STEAM OR HOT WATER HEATING BOILER.

No. 531,298. Patented Dec. 25, 1894.

Attest:
L. Lee.
Edw. Kinsey.

Inventor.
Lawrence R. Blackmore,
per Thomas S. Crane, Atty.

UNITED STATES PATENT OFFICE.

LAWRENCE R. BLACKMORE, OF NEWARK, NEW JERSEY.

STEAM OR HOT-WATER HEATING-BOILER.

SPECIFICATION forming part of Letters Patent No. 531,298, dated December 25, 1894.

Application filed May 24, 1894. Serial No. 512,249. (No model.)

*To all whom it may concern:*

Be it known that I, LAWRENCE R. BLACKMORE, a citizen of the United States, residing at Newark, Essex county, New Jersey, have invented certain new and useful Improvements in Steam or Hot-Water Heating-Boilers, fully described and represented in the following specification and the accompanying drawings, forming a part of the same.

The present improvements relate to a steam or hot water boiler formed of flat vertical sections provided each at the top with a series of three or more water arches connected at the crown by a circulating chamber, and which are continuous with independent water legs extended downward therefrom with the fire box or furnace between the same. The sections are combined with suitable front and rear plates to close the ends of the fire box, and either of such plates may be made hollow for the circulation of water. The construction is shown herein with a solid front having suitable fuel and cleaning out doors, and with a hollow water plate at the rear where the draft of the fire concentrates the heat more than upon the front. The water legs are connected at the bottom and at one or more intermediate points, such transverse water connections being preferably made of less thickness than the section to form smoke passages between the several sections connecting with a discharge flue below the same. Such discharge flues are located at opposite sides of the ash pit, and may be formed in a separate base, or with the sections by casting a passage through each section, and in such cases the outer water leg is preferably extended down the outer side of such discharge flue forming a water jacket to the same. The boiler sections are connected together at the top of the arch and at the bottoms of the water legs by suitable headers and wrought nipples. The rear ends of the discharge flues are connected by a smoke box to a common outlet. The water arches are made successively of greater thickness from the inner to the outer arch, and each of the arches is sloped outwardly upon its inner side to expose an inclined surface to the direct heat rays of the fuel. To secure such inclined surfaces, the inner arch is preferably made of wedge shape adjacent to the furnace and the adjoining arch of oval form in transverse section. The arches and water legs are separated by smoke passages which bring the heated gases in contact with all sides of the tubes. The inner water legs are made the full width of the section up to the springing of the inner arch, and the space between the inner and outer water legs thus forms a diving flue which connects by vertical passages with the discharge flues below. The sections are formed by casting in one piece, and the rear section is preferably formed of a flat water plate with half arches upon the inner side corresponding to the arches of the other sections, and provided beneath the arches with vertical corrugations to increase the heating surface. A direct draft outlet is formed through the corrugated portion of the rear plate just below the arches, and provided upon the outer side with a damper, and the section is also formed with indirect outlets at the bottom connecting with the discharge flues. A smoke box is secured upon the outer side of the rear section and is provided near the top with a collar for a smoke pipe, and is preferably formed in three castings, one of which extends between the indirect draft outlets. The second connects with the direct draft outlet, and the third forms a vertical connection between the other two. Each section is provided with a rocking grate except the rear section, which has a half of a similar grate attached removably thereto; thus providing each of the sections with a grate surface corresponding to the exposed heating surface.

My improvements will be understood by reference to the annexed drawings, in which—

Figure 10:
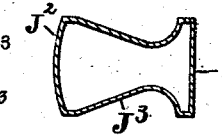
Figure 12:
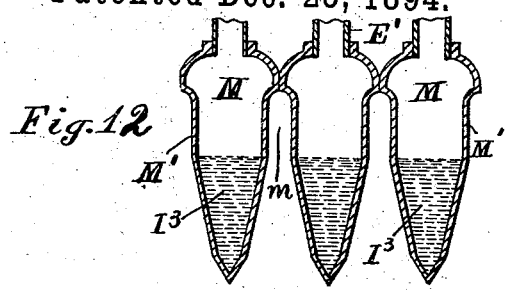
Figure 11:
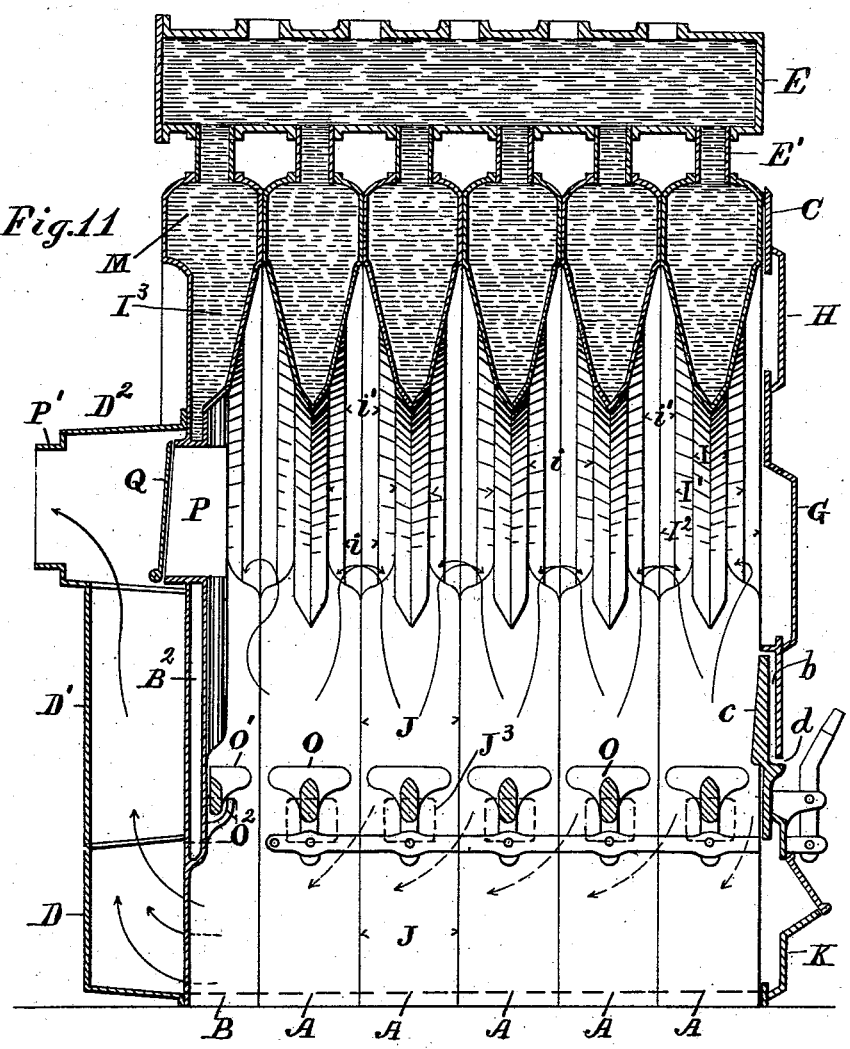

Figure 1 is a side elevation of the complete boiler; Fig. 2, a front elevation, and Fig. 3 a rear elevation of the same. Fig. 4 is a sectional plan on line $x, x$, in Fig. 2. Fig. 5 is an inside view of the rear section. Fig. 6 is a sectional plan on line $y, y$, in Fig. 5. Fig. 7 is an elevation of one of the main or intermediate boiler sections. Fig. 8 is a vertical transverse section of the same. Fig. 9 is a section of the three arches on line $z, z$, in Fig. 7. Fig. 10 is a section through the bottom transverse connection of one of the water legs on line $z, z$, in Fig. 7; and Fig. 11 is a vertical longitudinal section through the center of the boiler. Fig. 12 shows a modification of the steam chamber.

In Fig. 1, A designates the main sections; B, the rear section; C, the boiler front, and D, D', D², the several parts of the smoke box.

E is the top header connected with each of the boiler sections by pipe E', and F are the bottom headers connected with the water leg at each side by pipe F'.

G is the fuel door; H, the doors for cleaning out the diving flues; H', doors for cleaning out the smoke passages between the water arches; H², the doors for cleaning out the discharge flues, and K the ash pit door.

The sections are shown formed each with three concentric water arches and three water legs extended downward from the same, but a greater number of arches may be used in boilers of large capacity, and it is not essential that the arches should be concentric.

The advantages of the invention are fully secured by the use of three arches, as such construction furnishes an inner and outer arch with an intermediate arch which receives the direct heat rays from the fire through the spaces between the innermost arches.

I designates the inner water arch; I², the outer water arch; I', the intermediate arch; J, J², J', the water legs extended downward from the same, and J³ the transverse connection at the bottom of the same. The arches are separated in each section by smoke passages L and L', and the water legs by smoke passages $a$, $a'$, and the arches are connected at the top by a circulating chamber I³.

A steam chamber M extends upward from the chamber I³, and serves to collect the steam, in cases where the sections are used in steam heating. The outer arch I², as shown in Figs. 4 and 9, embraces the full thickness of the section, the middle arch I' is of substantially oval shape and of less thickness (crosswise of the section) and the inner arch I is of still less thickness; so that the spaces between the sections, at the inner arches I, are materially greater than the thickness of such arches, as shown at $i$ in Fig. 9. The spaces $i'$ between the intermediate arches are narrower than those lettered $i$ between the inner arches, as shown in Fig. 9, thus permitting the heat which radiates directly from the fuel to not only strike the outwardly sloping surfaces of the inner arch, as indicated by the arrows $i^2$, but also the edge portions of the arches I' and I², as indicated by the arrows $i$.

The inner arch I is somewhat pear-shaped in section, presenting an acute edge at the inner side, and rounded upon the outer side, as shown in Fig. 9. The outer and intermediate water legs are of the same shape as the water arches with which they are connected, but the inner water leg J is widened, from the springing of the arch downward, to the full width of the section, thus forming the diving flue which includes the passages $a$, $a'$ and $i'$. Water connections I⁴ are formed between the arches above the springing of the same, to permit a lateral circulation through the water legs when the boiler is used for generating steam and the level falls below the top of the passage L'.

N designates the discharge flues which are shown formed by the extension of the water leg J² downward below the connection J³, and by flanges N' having the same thickness as the section. The return water pipes F' are connected, as shown in Fig. 5, at the bottom of such water leg.

The rocking grate sections are designated O, and one half of such a grate section designated O' is shown attached removably upon the inner surface of the rear section, by fitting its ends in vertical sockets O². The rear section above the level of the passages N is formed of a water plate B' and provided, as shown in Figs. 5 and 11, with projections forming semi-arches and water legs corresponding to the water arches and water legs of the sections A, and designated by the same letters.

B designates the corrugated portion of the plate.

Below the level of the grate the plate is solid at the middle, as shown in Fig. 11, and the sides are formed with indirect outlets designated in Fig. 5 by the letter N like the discharge flues of which they form continuations. Upon the outer side of the rear section, as shown in Figs. 1 and 3, are secured by screws $s$ the three hollow castings forming the smoke box, the casting D connecting transversely the indirect outlets N, and the casting D' extending upward from the middle of the same to the casting D², which covers the direct outlet P and is provided with the smoke pipe collar P'. The outlet P is provided within the box D² with the damper Q which when closed, as shown in Fig. 11, drives the smoke downwardly into the diving flues, but which may be opened when kindling the fire to permit the direct passage of the gases to the smoke pipe.

Where it is required to burn bituminous coal, the fuel door G is formed upon the boiler front C some distance above the top of the grates, and the boiler front, below the door opening, is protected from the heat of the fire by an air space $b$ formed by a plate $c$ (see Fig. 11) which is attached to the front C at its ends and bottom edge. A row of air holes $d$ is formed in the boiler front at the bottom of such passage (see Fig. 2), and the air entering such holes prevents the overheating of the plate $c$ and escapes into the fire box through a slit at the top of such plate.

By the construction described for the arches, the smoke and gases are enabled to rise between all the arches into contact with the outer arch and water leg of each section, thus heating all the arches and water legs effectually.

By providing each section with a grate, and permitting the smoke and gases to rise directly between all the sections, I convert the entire interior of the boiler into a combustion chamber, which construction maintains the gases that rise from the combustion of the fuel at a high temperature, so as to be thoroughly consumed, and all the heat generated, before they are passed into the discharge flues.

As the outlets of the discharge flues are formed in the rear plate B, a tendency would naturally exist for the smoke and gases to pass downward between the rear sections; and to thus deprive the diving flues in the front sections of their proportion of the heat.

The spaces $f$ between the bottom transverse connections J which form the passages leading downward to the discharge flues N (see Fig. 4) are formed of equal width when the sections are made alike; but I provide a means of restricting the downward movement of the gases through such passages at the rear part of the boiler, consisting of detachable plates $g$ supported in the spaces $f$ and provided with openings $h$ of different sizes adapted to restrict the downward movement of the smoke in the desired manner. Such plates are shown in the passages between two rear boiler sections at the left hand of Fig. 4, and are in practice supported upon ribs $g'$ cast upon the connections $J^3$, as shown in Fig. 5, where one of the plates $g$ is shown in section. The heat from the smoke and gases is thus not only distributed between the different water tubes so as to heat the same most efficiently, but is distributed uniformly among the several sections and is then discharged without traversing any return flues. The water legs upon the outer sides of the discharge flues N serve to prevent radiation, and to absorb the heat from the gases.

By the transverse connections $J^3$ and $I^4$, the water is circulated freely between the several arches and water legs, and is thus enabled to move upward and downward in the same according to the variations of temperature which are created by the heat. The transverse water connections furnish passages for the free circulation of the fluid within the boiler when the external circulation is cut off, and thus prevent the formation of steam in the passages adjacent to the fire, and the overheating and burning of the metal at such points. The boiler is thus adapted to utilize the heat efficiently, and to avoid the injury which results where internal circulation is deficient.

Up to a certain limit the power of the boiler can be increased by increasing the number of sections which are combined together, and above such limit the power is increased by making the sections of larger dimensions, and if desired adding additional water arches thereto. In such case, the operation of the parts is the same, and the internal circulation is secured in the same manner by the transverse connections.

By using a series of water arches of successively greater thickness from the inner to the outer arch, I admit the direct rays of the fire to all of the arches, and by circulating the gases between the several arches and in the passages L, L', I am enabled to provide a large amount of water heating surface on each side of the fire box. I thus secure a proper proportion of heating surface to the grate surface without making the boiler of an excessive height, which feature is of great advantage in buildings having low cellars, or those which are heated by indirect steam radiators and require a low water line in the boiler.

The graduated passages between the diving flues and the discharge flues N may be formed, as shown at the lower side of Fig. 4, by casting plates $g^2$ of different sizes in the passages $f$.

Fig. 7 shows at the top a cross section of the chamber M which is adapted for a water heating boiler; but when the boiler is used in circulating steam through radiators, it is desirable to admit the smoke and heated gases to the sides of the chamber N to dry the steam before it is discharged from the boiler, and such admission is effected by the construction shown in Fig. 12, where the tops of the sections are shown recessed upon their sides into line with the edges of the middle arch I'. Such recesses M' form interspaces $m$ in which the heated gases circulate, and thus dry the steam as desired.

It will be noticed in Figs. 11 and 12 that the circulating chamber I is of graduated thickness and increasing in thickness toward the outer arch, like the arches which it connects; and the flames in the combustion chamber are thus enabled to reach both sides of the circulating chamber, and in some degree to heat the under sides of the steam chamber M.

The circulating chamber is of graduated thickness in both the constructions shown in Figs. 11 and 12.

The arches may obviously be made successively of greater thickness from the inner to the outer arch without sloping their faces in the manner shown in the drawings, and I do not therefore limit myself to such construction; although greater surface is exposed to the heat rays by sloping such surfaces, and the heat is also reflected off to the surfaces of the arches at the sides of the spaces L, L'. I have however claimed the inner arch of wedge shape and the adjoining arch of oval form transversely, as a special feature of my invention.

Having thus set forth the nature of the invention, what is claimed herein is—

1. In a vertical sectional boiler, a flat section having a series of three or more water arches, the said arches being successively of greater thickness from the inner to the outer arch, substantially as herein set forth.

2. In a vertical sectional boiler, a flat section having a series of three or more water arches, the said arches being successively of greater thickness from the inner to the outer arch, and connected at the top by a circulating chamber, and above the bases of the arches by a transverse connecting passage, as herein set forth.

3. In a vertical sectional boiler, a flat section having a series of three or more water arches, the said arches being successively of greater thickness from the inner to the outer arch, and connected at the top by a circulating chamber and above the bases of the arches by a transverse water connection of less thickness than the arches, as herein set forth.

4. In a vertical sectional boiler, a flat section having a series of water arches, the said arches being successively of greater thickness from the inner to the outer arch, and connected at the top by a circulating chamber and above the bases of the arches by a transverse water connection of less thickness than the arches, the water chamber and the transverse connection being of graduated thickness and increasing in thickness toward the outer arch, as herein set forth.

5. In a vertical sectional boiler, a flat section having a series of water arches, the said arches being successively of greater thickness from the inner to the outer arch, and each of the arches being sloped outwardly upon its inner side to expose an inclined surface to the direct heat rays, as herein set forth.

6. In a vertical sectional boiler, a flat section having a series of water arches, the said arches being successively of greater thickness from the inner to the outer arch, the inner arch being of wedge shape adjacent to the furnace and the adjoining arch of oval form transversely, as herein set forth.

7. In a vertical sectional boiler, an integral flat section having a series of three or more water arches with independent water legs extended downward therefrom at the sides of the furnace, substantially as set forth.

8. In a vertical sectional boiler, an integral flat section having a series of three or more water arches with independent water legs extended downward therefrom at the sides of the furnace, and connected at the top, bottom, and one or more intermediate points by transverse circulating passages or connections, substantially as herein set forth.

9. In a vertical sectional boiler, an integral flat section having a series of three or more water arches with independent water legs extended downward therefrom at the sides of the furnace and connected at the top, bottom, and one or more intermediate points by transverse circulating connections of less thickness than the section, as and for the purpose set forth.

10. In a vertical sectional boiler, an integral flat section having a series of three or more water arches with independent water legs extended downward therefrom, the said arches being successively of greater thickness from the inner to the outer arch, and the arches and water legs being connected at the top, bottom, and one or more intermediate points by transverse circulating connections of less thickness than the section, as and for the purpose set forth.

11. In a vertical sectional boiler, an integral flat section having a series of three or more arches with independent water legs extended downward therefrom at the sides of the furnace, the arches being connected at the top by a circulating chamber and the water legs at the bottom having a transverse water connection of less thickness than the section with a discharge flue in the section below such transverse connection, substantially as herein set forth.

12. In a vertical sectional boiler, an integral flat section having a series of three or more water arches with independent water legs extended downward therefrom at the sides of the furnace, the inner and outer water legs being of the same thickness as the section, the inner and middle arches being connected at the top by a circulating chamber, and the water legs at the bottom having a transverse water connection of less thickness than the section with a discharge flue in the section below such transverse connection, substantially as herein set forth.

13. In a vertical sectional boiler, an integral flat section having a series of three or more water arches with independent water legs extended downward therefrom at the sides of the furnace, the inner and outer water legs being of the same thickness as the section, the inner and middle arches and the middle water leg being of less thickness, the arches being connected at the top by a circulating chamber, and the water legs having a transverse water connection and a discharge flue below the level of the grate, and the outer water leg being extended down the outer side of such discharge flue, and provided with a pipe inlet, as herein set forth.

14. A vertical sectional boiler composed of a series of flat sections secured together, and comprising a series of arches with intermediate smoke passages over the furnace, a series of diving flues at the sides of the furnace, a discharge flue at the bottom of the section at each side of the boiler connected by passages between the sections with such diving flues, and a smoke box for connecting the rear ends of such discharge flues with the smoke pipe, substantially as herein set forth.

15. A vertical sectional boiler composed of a series of flat sections secured together, and comprising several series of arches with intermediate smoke passages over the furnace, a series of diving flues at the sides of the furnace, a discharge flue at the bottom of the section at each side of the boiler connected by passages between the sections with such diving flues, a rear section formed with a direct draft outlet at the under side of the arches, and smoke passages connecting with the bottom discharge flues, and a detachable smoke box upon the outer side of the rear section with passages to connect the discharge flues and the direct draft outlet with a smoke pipe, and the direct draft outlet having a damper to close the same at pleasure to throw the smoke into the diving flues, substantially as set forth.

16. A vertical sectional boiler composed of a series of flat sections secured together, and comprising several series of arches with intermediate smoke passages over the furnace, a series of diving flues at the sides of the furnace, a discharge flue at the bottom of the section at each side of the boiler connected by passages between the sections with such diving flues, a rear section formed with a direct draft outlet at the under side of the arches, and smoke passages connecting with the bottom discharge flues, and a smoke box connecting the two discharge flues and the direct draft outlet with a smoke pipe, as herein set forth.

17. In a vertical sectional boiler having the intermediate sections formed with a series of arches, and independent water legs extended downward therefrom, a rear section having a water plate B' with the half arches I, I', I² formed upon the inner side thereof, substantially as herein set forth.

18. In a vertical sectional boiler having the intermediate sections formed with a series of arches, and independent water legs extended downward therefrom, a rear section having a water plate B' with the half arches I, I', I² formed upon the inner side thereof, and making a single chamber with the water space within the plate, substantially as set forth.

19. A vertical sectional boiler having the intermediate sections formed with a series of arches, and independent water legs extended downward therefrom, with the inner water legs of the same thickness as the section to form diving flues, passages through the section below the water legs to form continuous discharge flues, with vertical smoke passages into the diving flues, a rear section having the flat plate with the half arches I, I', I² formed upon the inner side thereof corresponding to the intermediate sections and having the direct draft outlet P, the bottom smoke passages and the transverse water connections J³ to restrict the downward movement of the smoke from the diving flues, substantially as herein set forth.

20. A vertical sectional boiler composed of a series of flat sections secured together, and comprising a series of arches with intermediate smoke passages over the furnace, a series of diving flues at the sides of the furnace, a discharge flue at the botton of the section at each side of the boiler, graduated passages between the sections from the bottoms of the diving flues into the discharge flues to circulate the smoke and gases between the front sections, and a smoke box for connecting the rear ends of such discharge flues with the smoke pipe, substantially as herein set forth.

21. A vertical sectional boiler composed of a series of flat sections secured together, and comprising a series of arches with intermediate smoke passages over the furnace, a series of diving flues at the sides of the furnace, a discharge flue at the bottom of the section at each side of the boiler connected by passages between the sections with such diving flues, throttle plates applied to such passages with apertures adapted to circulate the smoke and gases between the front sections, and a smoke box for connecting the rear ends of such discharge flues with the smoke pipe, substantially as herein set forth.

22. A vertical sectional boiler composed of a series of flat sections secured together, and comprising a series of arches with intermediate smoke passages over the furnace, a series of diving flues at the sides of the furnace, a discharge flue at the bottom of the section at each side of the boiler connected by passages between the sections with such diving flues, the sides of the passage being formed with ribs, and removable plates supported on such ribs and formed with apertures graduated as set forth, to circulate the smoke and gases between the front sections, and a smoke box for connecting the rear ends of such discharge flues with the smoke pipe, substantially as herein set forth.

23. In a vertical sectional boiler, a flat section having a series of water arches formed successively of greater thickness from the inner to the outer arch, and connected at the top by the circulating chamber I³ tapered downwardly in conformity with the width of the several arches, substantially as set forth.

24. In a vertical sectional boiler, a flat section having a series of water arches formed successively of greater thickness from the inner to the outer arch, and connected at the top by the circulating chamber I³ having the steam chamber M extended upward from the same, substantially as set forth.

25. In a vertical sectional boiler, a flat section having a series of water arches formed successively of greater thickness from the inner to the outer arch, and connected at the top by the circulating chamber I³ having the steam chamber M extended upward from the same, and provided at the sides with the recesses M' to admit the gases for heating such steam chamber, substantially as set forth.

In testimony whereof I have hereunto set my hand in the presence of two subscribing witnesses.

LAWRENCE R. BLACKMORE.

Witnesses:
 THOMAS S. CRANE,
 L. LEE.